3,823,213
PRODUCTION OF EXPANDED MOLDINGS OF
OLEFIN POLYMERS
Fritz Stastny, Ludwigshafen (Rhine), Rudolf Gaeth, Limburgerhof, Pfalz, and Hans-Georg Trieschmann, Hambach, Weinstrasse, Germany, assignors to Badische Anilin- & Soda-Fabrik Aktiengesellschaft, Ludwigshafen (Rhine), Germany
No Drawing. Continuation of abandoned application Ser. No. 631,603, Apr. 18, 1967. This application Sept. 18, 1969, Ser. No. 859,477
Int. Cl. B29d 27/08; B29f 5/00
U.S. Cl. 264—51           6 Claims

ABSTRACT OF THE DISCLOSURE

A process for the production of moldings of expanded polymers of olefins having two or three carbon atoms in which the expanded particles of the polymer, which contain crosslinked portions, are heated in molds and fused together, if desired under pressure.

---

This is a continuation of application Ser. No. 631,603, filed Apr. 18, 1967 and now abandoned.

This invention relates to a process for the production of moldings of expanded olefin polymers in which expanded particles of the polymer are heated and fused together in molds.

To prepare moldings having a cellular structure, a method has been very widely used in industry in which a styrene polymer containing an expanding agent is first pre-expanded and the pre-expanded composition after a short storage period is heated inside a mold so that the particles expand and fuse together to form a molding whose dimensions correspond to those of the cavity of the mold used. By this method it is possible to prepare moldings having intricate shapes such as are used for example as packaging components. This method is however restricted to styrene polymers. It has hitherto not been possible to fuse together other cellular polymers, for example olefin polymers, in molds with equally satisfactory results.

Expanded olefin polymers having a closed-cell structure are obtained for example by a method in which the polymer is mixed with an expanded agent in continuous mixing equipment, for example in an extruder, and the mixture is released from pressure upon leaving the extruder die. By this method it is possible with certain expanding agents to obtain cellular particles or sheeting whose bulk density is from 20 to 50 grams/liter. According to another method, olefin polymers are heated in a mold under pressure with expanding agents which decompose into gaseous products when heated; the molding obtained is cooled, removed from the mold and then reheated to a high temperature, thus causing it to expand.

We have now found that expanded moldings of olefin polymers can be prepared particularly advantageously by heating expanded particles of olefin polymers which contain crosslinked portions in closed molds so that they fuse together.

It is a special advantage that, when the expanded particles of olefin polymers containing crosslinked portions to be used according to this invention are heated and fused together, moldings having a cellular structure are obtained whose shape corresponds to that of the mold used. It is possible in this way to obtain moldings having relatively intricate shapes and a closed-cell foam structure by a simple method.

Crystalline olefin polymers for the purposes of this invention are defined as polymers having crystalline regions of olefins having two or three carbon atoms whose X-ray crystallinity at 25° C. is more than 25%. Homopolymers of ethylene or propylene or copolymers of these monomers are thus suitable for the process. Copolymers of ethylene with other ethylenically unsaturated monomers which contain at least 50% by weight of olefin units are very suitable for the process. Copolymers of ethylene with 5 to 30% by weight of esters of acrylic acid or methacrylic acid with alcohols having two to eight, particularly two to four, carbon atoms, or vinylcarboxylic esters of carboxylic acids having two or three carbon atoms are specially suitable. Of the comonomers, esters of acrylic acid with n-butyl alcohol and with tertiary-butyl alcohol, as well as vinyl acetate are of particular importance.

The expanded particles of olefin polymers for the process according to this invention should preferably have a diameter of from 3 to 40 mm., advantageously from 5 to 25 mm. Expanded particles are defined as particles in which the cell membranes consist of the olefin polymer. For the process it is preferred to use particles having predominantly closed-cell structure. The expanded particles are obtained by conventional industrial methods, for example by mixing an olefin polymer with an expanding agent in an extruder and extruding the mixture through a die, the extrudate containing expanding agent thus obtained being comminuted immediately after it leaves the die. It is also possible however to use particles which have been obtained by heating mixtures of olefin polymers and those expanding agents which decompose with the formation of gaseous products.

The expanded particles contain crosslinked portions, i.e. some of the molecules are present in crosslinked form so that the particles contain insoluble portions, the so-called gel content. Particles of olefin polymers which have a gel content of 10 to 88% by weight, preferably 30 to 80% by weight, are particularly suitable for the process. Gel content is defined as the percentage by weight of the polymer which is insoluble in solvents at temperatures above the crystallinity melting point. Solvents are used in which the polymer containing no crosslinked portions is soluble. In the case of ethylene copolymers the gel content may be determined for example by heating the particles in toluene to a temperature of 100° C. and filtering off and drying the insoluble fraction.

The expanded particles containing crosslinked portions may be obtained by various methods. Of these, a method in which the expanded closed-cell particles are treated with high-energy rays, particularly X-rays and electron rays, has proved to be particularly suitable. In one particularly suitable method of preparing the particles the particulate olefin polymer is treated with electron rays the dosage of which is from 2.5 to 60, preferably 40 to 50, megarad. (1 megarad is $10^6$ rad, 1 rad being the absorbed energy of 100 erg per gram.)

It is also possible however to use expanded particles having crosslinked portions which have been obtained by reaction with compounds which decompose into free radicals. Thus for example particles may be used which have been prepared by comminuting moldings such as are obtained by expanding mixtures of ethylene polymers and expanding agents which decompose with the formation of gaseous products. Sometimes it is advantageous to add to such mixtures peroxides which cause a further crosslinking of the molecules. For example the comminution products of moldings of olefin polymers which have been obtained by expansion using azodiisobutyronitrile are suitable.

The particless of expanded olefin polymers may contain in addition to the polymers other components, such as flame retardants, dyes, fillers, lubricants or other polymers, for example polyisobutylene. Sometimes it is advantageous to process the expanded particles mixed with course-grained or fibrous filers or reinforcement materials. Examples of these are wood fibers, other porous materials or fibers of thermoplastics. Coarse-meshed fabric or lattices, for example of thermoplastics, may also be incorporated in the moldings as reinforcement materials.

Heating of the particles is carried out in closed molds. Closed molds are defined as molds whose walls are firmly connected and which should be so designed that, when the particles are heated, the gaseous or liquid substances, such as air or water, may escape from the mold but the expanded particles cannot escape. It is advantageous to use molds whose walls are perforated or are provided with small-bore nozzles through which the heating medium may enter the mold and air may escape. The particles can be fused together in the molds without the use of pressure.

A molding is obtained in which the particles are fused together in a loose mass so that interstices are present between the particles. It is usually advantageous however to fuse the particles together under pressure. In a particularly advantageous embodiment of the process molds are used at least one wall of which is movable so that the contents of the mold may be compressed before, during or after heating. A particularly advantageous procedure is first to heat the particles and then to compress them. According to a particularly advantageous embodiment of the process the particles are compressed from two sides of the mold toward the center thereof. It is also possible however to compress the particles from a number of directions, for example first from two sides and then from the base or the top. In particular, moldings having relatively large dimensions may be obtained by this method.

Closed molds also include continuous shaping equipment such as is used for the continuous production of moldings of particulate expanded plastics. Such equipment may for example consist of four conveyor belts so arranged that they form a channel. The particles are introduced at one end of this channel, then expanded and the resultant strand of expanded plastic is discharged at the other end of the channel. The conveyor belts may be arranged in such a way that the particles are compressed prior to being fused together. The conveyors may also be of the apron type. To prepare wide sheeting, only two parallel conveyor belts are usually necessary, rigid or movable walls being arranged at the sides so that a channel is formed.

The expanded particles should be heated in the mold to a temperature at which they fuse together. This temperature is dependent on the chemical constitution of the polymer, on the degree of crosslinking and on the other additives.

In order to fuse the particles together, they are advantageously heated to temperatures at which at least 25% of the crystallite present at room temperature (25° C.) has melted. It is particularly advantageous to use temperatures of from 90° to 140° C.

When copolymers of ethylene with acrylic esters or vinyl acetate are used, the processing temperature is advantageously from 90° to 135° C.

Heating of the particles in the mold may be carried out with different heating media. Thus for example it is possible to introduce hot gases, vapors or liquids into the mold. It is particularly advantageous to place the molds whose cavities have been filled with the expanded particles in liquids in which the polymers are insoluble. Examples of particularly suitable heating liquids are water, glycerol or aqueous salt solutions. A simple method consists in passing hot steam into the mold. The particles in the mold may also be heated by infrared radiation or by introducing hot air. It is also possible to coat the particles with small amounts of a substance which has a high dielectric loss, for example water or aqueous salt solutions, and to heat them in a high frequency field after they have been introduced into the mold.

A particularly advantageous method of heating the particles is to pass the heating medium through the mold cavity. The heating medium is advantageously introduced at one side of the mold and allowed to leave at the opposite side. In preparing intricate moldings, it is sometimes advantageous to allow the heating medium to enter the mold at a number of places and to withdraw it at one side, for example at the base of the mold. According to an advantageous method which saves energy the heating medium is recycled through the mold. This method has proved to be particularly suitable when carrying out the process continuously.

It is however, also possible to carry out heating by probes or perforated tubes located between the expanded particles so that heating is effected from the interior of the mold cavity; this type of heating may be used additionally. Heating may thus be intensified and the working cycle shortened, particularly in the case of large moldings. The probes are removed prior to compression of the particles.

The heating media may be liquid or gaseous. It is particularly advantageous to use water or aqueous solutions, for example of salts or high boiling point liquids which are miscible with water. Of the gaseous media, mixtures of air and steam have proved to be particularly suitable.

According to a particularly advantageous method of carrying out the process the particles are compressed in the mold by 5 to 70%, advantageously by 40 to 60%, of their original bulk volume. The particles may be compressed before, during or particularly after they have been heated. Depending on the pressure used, moldings of fused particles are obtained between the particles of which there are interstices or which constitute homogeneous moldings. During compression the particles are so deformed that they form polyhedrons which are fused together at their surfaces.

After the particles have been fused together, the moldings are allowed to cool to temperatures which are below the crystalline melting point, advantageously below 40° C.

The resultant moldings may be reheated after they have been removed from the molds so that they further expand, thus forming a molding having a lower unit weight. The moldings may also be comminuted and the particles obtained reheated in molds under pressure.

It is possible, by using ethylene copolymers, to obtain moldings which are flexible and whose unit weight is from 15 to 30 kg./cubic meter; this was impossible by prior art methods. The moldings have particularly great shock elasticity and low compression set. Expanded plastics prepared in this way may be used with advantage in many fields. For example upholstery, packaging components, thermal and sound insulation in buildings, floating intermediate flooring or toys may be prepared by the process according to the invention. The moldings may also be cut by means of a heated metal wire into individual sections, for example into films or sheeting.

The invention is illustrated by the following Examples in which percentages are by weight.

EXAMPLE 1

Loose spherical particles having a diameter of 20 mm. and a bulk density of 16 grams/liter made of an expanded copolymer having substantially closed-cell structure and derived from 83% of ethylene and 17% of tertiary-butyl acrylate are exposed to radiation of 60 megarad in an electron accelerator. After this treatment, the gel content is 84%. These particles are placed in a perforated metal mold capable of being tightly closed and having one wall which is movable, and are compressed by about 50% of their original volume. The closed mold is kept for ten minutes in water at 95° C. A coherent, homogeneous, very flexible, highly elastic, extensible and tear-resistant expanded plastic having a unit weight of 32 grams/liter is obtained in which the particles are completely fused together. The molding is eminently suitable as upholstery material.

When closed-cell particles consisting of a mixture of 90 parts by weight of the same copolymer and 10 parts by weight of polyisobutylene having a molecular weight of 150,000 are used instead of the said copolymer particles, the expanded plastics obtained under the same irradiation and processing conditions are particularly soft and flexible.

If the particles are compressed by 70% of their original volume, a particularly compact molding is obtained.

EXAMPLE 2

A copolymer derived from 80% of ethylene and 20% of vinyl acetate is mixed in an extruder with a low boiling point hydrocarbon mixture with the application of heat and pressure. The hot mixture is extruded through a die and comminuted. The particles expand after they have been comminuted. They have a bulk density of 35 grams/liter and a diameter of 10 mm. The particles thus obtained are exposed to electron radiation of 50 megarad. After being subjected to this treatment, the particles have a gel content of 68 to 70%.

The particles are introduced into a metal mold provided with perforations which is then closed. The mold is heated for thirty minutes in a steam autoclave at a temperature of 125° C. The particles are then compressed by 30% of their original volume and cooled in this condition. A coherent, partly air-permeable expanded plastic is obtained having very good mechanical and elastic properties which is suitable for example as shock-absorbing material in the packaging industry or for insertion beneath floating intermediate flooring to reduce the noise of footsteps.

If the particles are compressed by only 5% of their original volume, a molding is obtained in which the particles are fused together at only relatively small areas of their surfaces.

EXAMPLE 3

Expanded particles having substantially closed-cell structure of a copolymer derived from 75% of ethylene and 25% of n-butyl acrylate having a diameter of 10 to 15 mm. and a bulk density of 21 grams/liter are exposed to radiation with X-rays until the gel content is 75%. The particles thus treated are placed in a metal mold having perforations through which steam is introduced into the mold. Steam under a pressure of 0.5 atmosphere gauge is injected into the mold for two minutes. The particles are then compressed by 50% of their original volume and left for fifteen minutes at room temperature in this condition. A coherent, highly flexible, homogeneous expanded plastics molding is obtained having a unit weight of 42 grams/liter.

Moldings can be obtained in the same way from particles having a gel content of 10 or 25%.

EXAMPLE 4

A mixture is prepared on rollers at 110° C. from the following ingredients:

100 parts by weight of a granular copolymer derived from 80% of ethylene and 20% of vinyl acetate;
10 parts by weight of powdered azodicarboxylic amide;
1 part by weight of powdered tertiary-butyl perbenzoate;
5 parts by weight of powdered zinc oxide;
10 parts by weight of powdered calcium carbonate; and
5 parts by weight of dibutyl phthalate.

The mixture is placed in the form of rolled sheet into a metal mold which is gastight when closed and is kept at 170° C. under a pressure of 200 atmospheres gauge for a period of fifteen minutes. The whole is allowed to cool to room temperature and an expandable molding is obtained. This molding is kept in a heating cabinet at 170° C. for twenty-five minutes. A finely cellular expanded plastic is formed having a unit weight of 22 grams/liter. The expanded plastic is broken up in a cross beater mill into particles having a diameter of 5 to 10 mm. and the particles are introduced into a metal mold provided with perforations which is not gastight when closed. The mold is closed, thereby compressing the particles by about 55% of their original bulk volume. The mold is then kept for twenty minutes at 120° C. in a bath of glycerol. A coherent molding is obtained whose dimensions correspond to those of the cavity of the mold, which has a unit weight of 115 grams/liter and which has very good mechanical and shock-absorbing properties.

The molding is suitable for example as a sealing material and for the production of floats, etc.

EXAMPLE 5

A mixture is prepared at 110° C. on rollers from the following components:

100 parts by weight of a copolymer derived from 83% of ethylene and 17% of tertiary-butyl acrylate;
10 parts by weight of azodicarboxylic amide in powdered form;
1 part by weight of powdered tertiary-butyl perbenzoate;
5 parts by weight of powdered zinc oxide;
10 parts by weight of calcium carbonate in powdered form; and
5 parts by weight of butyl phthalate.

The mixture in the form of a rolled sheet is placed in a metal mold which is gastight when closed and kept for fifteen minutes at 170° C. and a pressure of 200 atmospheres gauge. The whole is allowed to cool to room temperature and an expandable molding is obtained. This molding is broken up mechanically into particles having a diameter of 3 to 8 mm. These particles are kept for twenty-five minutes in a water bath containing salt at 105° C. The particles expand to closed-cell particles of larger size having a bulk density of 60 grams/liter.

The pre-expanded particles are placed in a metal mold which is not gastight when closed and are heated by injecting steam through the perforations. The particles are compressed while hot. A coherent, highly flexible expanded plastics molding is obtained having a unit weight of 120 grams/liter which is eminently suitable for the manufacture of buoyancy members.

EXAMPLE 6

Polyethylene having a specific gravity of 0.918 and a melt index of 1.5 is mixed on mixing rollers at 110° C. with an addition of 0.30% of dicumyl peroxide, 10% of azodicarboxylic amide and 5% of powdered zinc oxide to form a homogeneous composition which is removed in the form of a rolled sheet. The rolled sheet is placed in superposed layers in a gastight mold and subjected for thirty minutes in the closed mold to a temperature of 170° C.; it is then cooled. An unexpanded molding is formed. This is kept for thirty minutes in hot air at 120° C. A finely cellular expanded plastics molding is thus formed which has a gel content of 75%. The expanded plastics molding is broken up into particles having a diameter of 5 to 10 mm. The particles have a bulk density of 30 grams/liter.

The resultant expanded plastics particles containing crosslinked portions are introduced into a cylindrical perforated metal mold having a base diameter of 30 cm. and a height of 35 cm. and compressed to a height of 17.5 cm. The mold is kept in this condition in a bath of glycerol for fifteen minutes at 125° C. The molding is then removed from the mold and cooled to room temperature.

A homogeneous expanded plastics molding having a unit weight of 60 grams/liter is obtained which is distinguished by good flexibility and favorable mechanical properties. It is suitable for example as shock-absorbing material.

EXAMPLE 7

Expanded particles of 60% of polypropylene and 40% of polyisobutylene having a molecular weight of 150,000, a particle size of 5 to 8 mm. and a bulk density of 13.9 grams/liter are exposed to electron radiation of 40 megarad. The gel content after this treatment is 52%.

The particles are placed in a perforated metal mold, in which polytetrafluoroethylene cloth has been laid, and kept for two hours in hot air at 150° C. The particles are then compressed so that their volume is 40% of the original bulk volume. A homogeneous molding is formed by the fusing together of the individual particles. The molding has a unit weight of 35 grams/liter, closed cells and is very suitable as insulating material, for example for insulating liquid containers which are exposed to temperatures of 120° C.

EXAMPLE 8

Expanded particles are prepared from the following mixture:

87% of polyethylene (apparent density 0.918; melt index 1.2 to 1.3);
10% of chloroparaffin;
5% of antimony trioxide; and
3% of talc.

The expanded particles have an average diameter of 8 mm. and a bulk density of 14 grams/liter. They are exposed to electron radiation of 5 megarad. After this irradiation the gel content is 16%.

The particles are thereafter placed in a metal mold provided with perforations and having a lining of perforated sheets made from polytetrafluoroethylene and are kept for ninety minutes at 135° C. in hot air.

The particles are then compressed to 45% of their original bulk volume and cooled for fifteen minutes at room temperature. A homogeneous molding having a unit weight of 32 grams/liter is removed from the mold; it is soft and flexible and has very low thermal conductivity. The expanded plastic formed is self-extinguishing (i.e. it ceases to burn when removed from the igniting source).

The expanded plastics molding may be cut up into sheets of different sizes and thicknesses with a band saw. Sheets or sections of sheets are uitable for example as carpet underlays, for roof insulation and for joint sealing in the building industry, as interlayers in the soil in the construction of sportsgrounds and roads, and as structural or insulating material in railroad cars, automobile bodies and ships.

EXAMPLE 9

Closed-cell expanded particles of polyethylene (specific gravity 0.928, melt index 0.1 to 0.3) having a particle size of 5 to 10 mm., a gel content of 50% and a bulk density of 17.2 grams/liter are placed in a metal mold similar to that described in Example 8 and kept in hot air at 125° C. for one hundred minutes. The particles are then compressed to half their original bulk volume. An expanded plastics molding having a unit weight of 34.4 grams/liter is obtained having the typical properties of a soft plastic, namely high compressibility, good flexibility and high resilience.

The expanded plastic may be used as a substitute for conventional soft or rigid foam plastics, for natural or synthetic materials, for insulating materials, packings and the like, for example as floats, packaging components, upholstery material and insulating material for cold-storage applications and for the building industry.

EXAMPLE 10

A metal mold having six perforated surfaces and a cavity measuring 60 x 60 x 30 cm. is filled with expanded plastics particles having an average diameter of 8 to 15 mm. and a bulk density of 17 grams/liter. The particles consist of a mixture of 78% of a copolymer, which is derived from 77.2% of ethylene and 22.8% of tertiary-butyl acrylate, 19% of polyisobutylene having a molecular weight of 150,000 and 3% of talc. The particles contain crosslinked portions. The gel content is 85%.

The mold is so designed that the upper and lower surfaces can be moved toward the center of the mold. The top of the mold is attached to a casing through which water can be passed which then enters the cavity in the mold through the perforations in the plates.

Water at 92° C. is introduced into the cavity of the mold through the top for a period of five minutes. The water leaves through the sides and the bottom after it has flowed round the particles. The top and bottom are then moved simultaneously toward the center of the cavity of the mold so that the particles are compressed into a space measuring 60 x 30 x 30 cm. The mold is opened five minutes later. A molding is obtained having a unit weight of 33 kg./cubic meter. It is cut up into sections having a thickness of 3 cm. by means of a band saw. The sheets obtained have good flexibility and high resilience. The may be used as shock-absorbing packaging material, as insulating material or for the production of lifejackets.

EXAMPLE 11

A mold constructed as described in Example 10 and having a cavity 50 x 50 x 25 cm. is filled with particles having a mean diameter of 5 to 15 mm. and a bulk density of 14 grams/liter. The expanded plastics particles consist of a mixture of 88% of a copolymer, which is derived from 84% of ethylene and 16% of tertiary-butyl acrylate, 9% of polyisobutylene having a molecular weight of 150,000 and 3% of talc. The expanded plastics particles contain crosslinked portions. The gel content is 75%. Air at 90° C. is injected through the perforated top and sides of the mold at a rate of 120 liters per minute for a period of fifteen minutes. The air leaves the mold through the bottom after having passed round the particles. The top and bottom are then pressed toward the center of the mold cavity. A molding is obtained which has the dimensions 50 x 25 x 25 cm. and a unit weight of 27 kg. per cubic meter. The molding is cut up into sheets with a band saw.

What is claimed is:

1. A process for the production of expanded moldings which comprises: heating polyethylene or a copolymer of ethylene with 5 to 30% by weight of the monomer selected from the group consisting of esters of acrylic acid with alcohols having 2 to 8 carbon atoms, esters of methacrylic acid with alcohols having 2 to 8 carbon atoms and vinylcarboxylic esters of carboxylic acids having 2 or 3 carbon atoms, said polymer or copolymer having an X-ray crystallinity at 25° C. which is more than 25% and containing an expanding agent to a point sufficiently high to expand said olefin polymer; subjecting particles of the expanded polymer to high energy radiation to produce expanded particles having a gel content of from 10 to 88% by weight; placing said particles in a closed mold from which gaseous and liquid substances can escape but from which the particles cannot escape; heating said particles in said mold to a temperature at which they fuse together; and compressing said particles within said mold by from 5 to 70% of their original bulk volume.

2. A process for the production of expanded moldings wherein expanded particles of polyethylene or polypropylene or a copolymer of ethylene with 5 to 30% by weight of a monomer selected from the group consisting of esters of acrylic acid with alcohols having 2 to 8 carbon atoms, esters of methacrylic acid with alcohols having 2 to 8 carbon atoms and vinylcarboxylic esters of carboxylic acids having 2 or 3 carbon atoms whose X-ray crystallinity at 25° C. is more than 25% and containing crosslinked portions in such an amount that from 10 to 88% by weight of the homopolymer or copolymer is insoluble in solvents at temperatures above the crystallinity melting point using solvents in which the non-crosslinked polymer is soluble
   (a) are placed in a closed mold from which gaseous and liquid substances can escape but from which the particles cannot escape,
   (b) are heated to a temperature at which they fuse together, and
   (c) are compressed by about 5 to 70% of their original bulk volume.

3. A process according to Claim 2 wherein the insoluble portion of said homopolymer or copolymer is of from 30 to 80% by weight.

4. A process according to Claim 2 wherein the said particles are compressed from two sides toward the middle of a mold.

5. A process according to Claim 2 wherein the said particles are heated in a mold by passing a heating medium through the mold cavity.

6. A process according to Claim 2 wherein the said particles are heated in a mold by passing a heating medium through the mold cavity containing the particles to a temperature at which at least 25% of the crystalline fraction is fused and the particles are compressed by 5 to 70% of the original bulk volume of the particles.

References Cited
UNITED STATES PATENTS

| | | | |
|---|---|---|---|
| 3,010,157 | 11/1961 | Cizek | 260—2.5 B |
| 3,250,730 | 5/1966 | Palmer | 260—2.5 E |
| 3,255,286 | 6/1966 | Luc-Belmont | 264—51 UX |
| 3,359,353 | 12/1967 | Oddi | 264—321 X |
| 3,379,802 | 4/1968 | Raley | 260—2.5 BX |
| 3,452,390 | 7/1969 | Borcovec | 264—321 X |
| 3,098,832 | 7/1963 | Pooley et al. | 264—Dig. 18 |
| 3,368,009 | 2/1968 | Oddi | 264—53 |
| 3,504,068 | 3/1970 | Zizlsperger et al. | 264—53 X |

OTHER REFERENCES

Billmeyer, Fred W.: "Textbook of Polymer Science," New York, Interscience, © 1962, pp. 363–376.

Frank, H. P.: "Polypropylene," New York, Gordon and Breach Science Publishers, © 1968, pp. 1–9.

PHILIP E. ANDERSON, Primary Examiner

U.S. Cl. X.R.

260—2.5 B; 264—54, 126, 321, Dig. 5, Dig. 17, Dig. 18

UNITED STATES PATENT AND TRADEMARK OFFICE
CERTIFICATE OF CORRECTION

PATENT NO. : 3,823,213
DATED : July 9, 1974
INVENTOR(S) : Fritz Stastny, Rudolf Gaeth & Hans-Georg Trieschmann It is certified that error appears in the above-identified patent and that said Letters Patent are hereby corrected as shown below:

Column 1, in the heading, insert --Claims Priority, Applications German, April 28, 1966, P 16 29 281.2, and August 23, 1966, P 16 29 295.8--;

Column 7, line 45, delete "uitable" and substitute --suitable--.

Signed and Sealed this sixth Day of January 1976

[SEAL]

Attest:

RUTH C. MASON
*Attesting Officer*

C. MARSHALL DANN
*Commissioner of Patents and Trademarks*